(12) United States Patent
Zhang et al.

(10) Patent No.: US 11,445,428 B2
(45) Date of Patent: Sep. 13, 2022

(54) METHOD AND DEVICE FOR SETTING UP ROUTE PATH

(71) Applicant: Beijing University of Posts and Telecommunications, Beijing (CN)

(72) Inventors: Pei Zhang, Beijing (CN); Xiaohong Huang, Beijing (CN); Dandan Li, Beijing (CN); Kun Xie, Beijing (CN); Jiankai Lin, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 39 days.

(21) Appl. No.: 17/239,617

(22) Filed: Apr. 25, 2021

(65) Prior Publication Data

US 2022/0095198 A1 Mar. 24, 2022

(30) Foreign Application Priority Data

Sep. 18, 2020 (CN) .......................... 202010989888.1

(51) Int. Cl.
*H04W 40/04* (2009.01)
*H04W 40/20* (2009.01)
*H04W 40/24* (2009.01)

(52) U.S. Cl.
CPC ........... *H04W 40/04* (2013.01); *H04W 40/20* (2013.01); *H04W 40/246* (2013.01)

(58) Field of Classification Search
None
See application file for complete search history.

(56) References Cited

U.S. PATENT DOCUMENTS

| 2008/0310340 | A1* | 12/2008 | Isozu | H04L 45/10 |
| | | | | 370/328 |
| 2018/0234907 | A1* | 8/2018 | Abdallah | H04L 67/104 |
| 2019/0097911 | A1* | 3/2019 | Watanabe | H04L 1/1685 |
| 2019/0141645 | A1* | 5/2019 | Abouelseoud | H04W 12/06 |

* cited by examiner

*Primary Examiner* — Brian S Roberts
(74) *Attorney, Agent, or Firm* — Westbridge IP LLC (57) ABSTRACT

Examples of the present disclosure provide a method for setting up a route path, a device and a computer-readable storage medium. The method may include: establishing a neighbor list; wherein, the neighbor list comprises neighbor nodes of the node and position information of the neighbor nodes; in response to receiving a routing request (RREQ) message from a previous hop node, recording a source Internet Protocol (IP) address of a source node contained in the RREQ message as a destination IP address in a routing table established in the node; recording the previous hop node as a next hop node corresponding to the destination IP address in the routing table; selecting a pre-determined number of nodes from the neighbor list as next hop nodes of the RREQ message according to the position information of the neighbor nodes; and sending the RREQ message to the next hop nodes.

20 Claims, 7 Drawing Sheets

METHOD AND DEVICE FOR SETTING UP ROUTE PATH

CROSS-REFERENCE TO RELATED APPLICATIONS

The application claims priority of Chinese patent application CN 202010989888.1, filed on Sep. 18, 2020, the entire contents of which are incorporated herein by reference.

TECHNICAL FIELD

The present disclosure relates to wireless routing technology. In particular, the present disclosure relates to a method and a device for setting up a route path in a wireless Mesh network.

BACKGROUND

Wireless Mesh network routing protocols can be basically divided into three types according to different route discovery mechanisms. These routing protocols include a table-driven routing protocol, an on-demand routing protocol and a hybrid routing protocol.

According to the table-driven routing protocol, every node in a network should maintain a routing table of the whole network, which may contain route paths from this node to all other nodes in the network. However, with the expanding of the scale of the network, routers of the network must calculate transmission paths in the network repeatedly, which may bring great burden to the routers, reduce the utilization rate of CPUs of the routers, increase hardware heat losses of the routers, increase the occupation of bandwidth, and reduce the utilization rate of data transmission.

According to the on-demand routing protocol, when a node in a network has communication requirements, a routing request message would be sent in a broadcast mode, while a routing response message would be sent back in a unicast mode. Routing information would not be stored at any node after the transmissions of the routing request message and the routing response message. However, when the network is filled with broadcast data, a large amount of network bandwidth would be occupied, data packets could not be processed in time, therefore, services cannot be carried out normally. As a sequence, a broadcast storm may occur. In this case, a local area network or the whole network would become paralyzed. Moreover, the risk of unicast is that intermediate nodes may have too high bandwidth occupation rate and thus data blocking may occur during this process.

The hybrid routing protocol combines the table-driven routing protocol with the on-demand routing protocol, which uses the table-driven routing protocol in a small scope, and uses the on-demand routing protocol when the destination node is far away. However, the hybrid routing protocol is complex in mobility management and has many difficulties in implementation.

In addition, according to the above protocols, routing selection mostly focuses on the number of hops. That is, a route path with a minimum number of hops would be selected to transmit a data packet. However, the route path selected may not be the route path with the shortest wireless link among the route paths with the same number of hops, therefore, the transmission delay of a data packet may increase due to a longer distance of the wireless link selected.

SUMMARY

In view of the above, the present disclosure provides a method for setting up a route path, performed by a node in a wireless Mesh network.

The method for setting up a route path may include the following steps. At first, a node may establish a neighbor list; wherein, the neighbor list comprises neighbor nodes of the node and position information of the neighbor nodes. In response to receiving a routing request (RREQ) message from a previous hop node, the node may on the one hand record a source IP address of a source node contained in the RREQ message as a destination IP address in a routing table established in the node and may record the previous hop node as a next hop node corresponding to the destination IP address in the routing table. Further, the node may on other hand select a pre-determined number of nodes from the neighbor list as next hop nodes of the RREQ message according to the position information of the neighbor nodes; and send the RREQ message to the next hop nodes. With the above processing and forwarding procedure of the RREQ message, a route path from the source node to the destination node of the RREQ message can be discovered, and at the same time, a rout path from the destination node to the source node of the RREQ message can be recorded in routing tables of the nodes along the route path.

Based on the above method, the present disclosure also provides a device for setting up a route path, which includes: one or more processors, one or more memories, and a communication bus configured to couple the one or more processors and the one or more memories; wherein the one or more memories store one or more instructions, and when executed by the one or more processors, the instructions cause the one or more processors to perform the following steps. At first, the one or more processors may establish a neighbor list; wherein, the neighbor list comprises neighbor nodes of the node and position information of the neighbor nodes. In response to receiving a RREQ message from a previous hop node, the one or more processors may on the one hand record a source IP address of a source node contained in the RREQ message as a destination IP address in a routing table established in the node and record the previous hop node as a next hop node corresponding to the destination IP address in the routing table. The one or more processors may on the other hand select a pre-determined number of nodes from the neighbor list as next hop nodes of the RREQ message according to the position information of the neighbor nodes and send the RREQ message to the next hop nodes.

The present disclosure also provides a non-transitory computer-readable storage medium, wherein the non-transitory computer-readable storage medium stores computer instructions, and the computer instructions being used to make the computer execute the method for setting up route path disclosed.

According to the above method and device, since the RREQ message is sent to only a pre-determined number of next hop nodes rather than being broadcast to all its neighbors, a broadcast storm could be well avoided. Moreover, since the next hop nodes of the RREQ message are determined based on the position information of its neighbor nodes, or specifically based on the Euclidean distances between the destination node of the RREQ message and the neighbor nodes, the route path set up would be a path with a shortest transmission delay from the destination node of the RREQ message to the source node of the RREQ message, therefore, the transmission delay of a data packet would be minimized.

BRIEF DESCRIPTION OF DRAWINGS

In order to explain one or more examples of the present disclosure more clearly, accompanying drawings illustrating examples of the present disclosure are briefly introduced. Obviously, the accompanying drawings are only one or more examples of the present disclosure. Those of ordinary skill in the art may further obtain other accompanying drawings based on these accompanying drawings without paying any creative work.

DETAILED DESCRIPTION OF THE EXAMPLES

In order to make objectives, technical solutions, and advantages of the present disclosure clearer, the present disclosure will be further described in detail with reference to specific examples described below together with the accompanying drawings.

It should be noted that, unless otherwise defined, the technical terms or scientific terms used in one or more examples of the present disclosure should have the ordinary meanings understood by persons with ordinary skills in the art. The terms "first", "second" and the like used in one or more examples of the present disclosure do not indicate any order, quantity, or importance, but are only used for distinguishing different constituent components. The terms "comprising" or "containing" and the like mean that the element or object appearing in front of the term covers the elements or objects and their equivalents listed after the term, without excluding other elements or objects. The terms such as "connection" or "connected" and the like are not limited to physical or mechanical connections, but may comprise electrical connections, regardless of direct connection or indirect connection. The terms "up", "down", "left", "right" and the like are only used for indicating the relative position relationship. When the absolute position of the described object changes, the relative position relationship may also change accordingly.

Technical solutions of examples of the present disclosure will be described in detail in combination with the accompany drawings.

Figure 1:
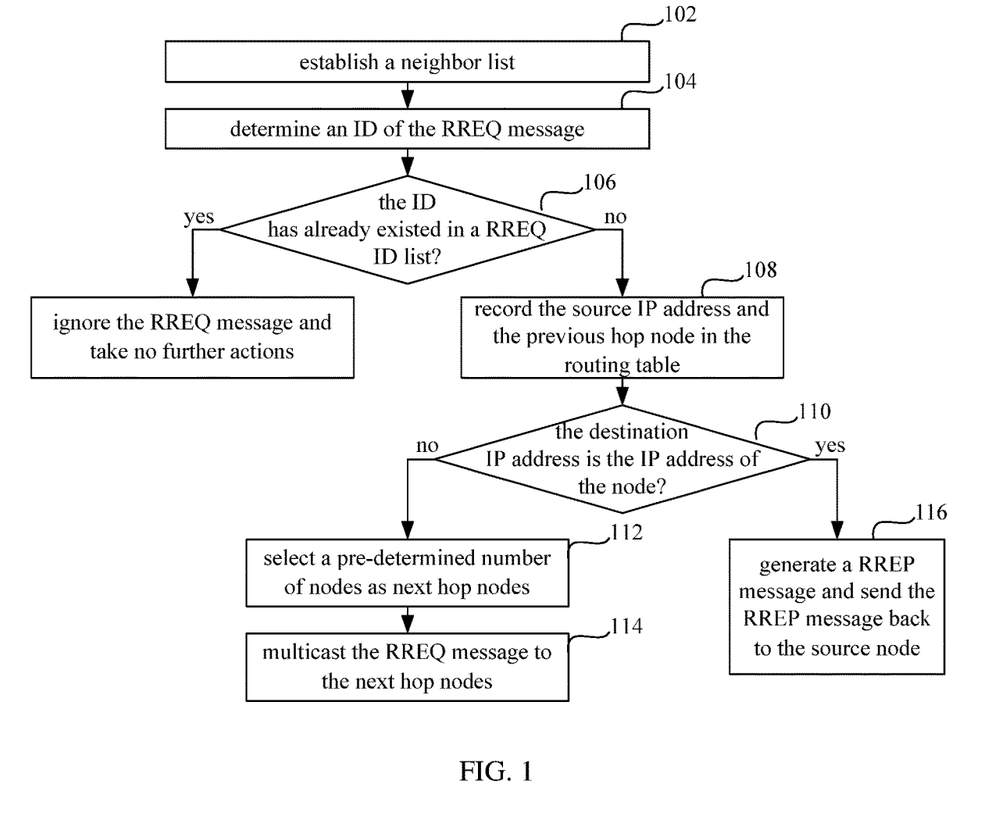
FIG. 1 is a flow chart illustrating a method for setting up a route path in a wireless Mesh network according to one or more examples of the present disclosure.

FIG. 1 is a flow chart illustrating a method for setting up a route path in a wireless Mesh network according to one or more examples of the present disclosure. To be noted, the method is a location-based routing method and may be performed by any node in the wireless Mesh network. According to FIG. 1, the method may include the following steps.

In block 102, a node establishes a neighbor list; wherein, the neighbor list may include all neighbor nodes of the node and position information of every neighbor node.

In some examples of the present disclosure, the neighbor list may also include a transmission delay between the node and each neighbor node. Moreover, the process of establishing the neighbor list may be called as a neighbor discovery process. The specific neighbor discovery process for establishing the neighbor list may be discussed later.

In block 104, in response to receiving a routing request (RREQ) message from a previous hop node, the node determines an identification (ID) of the RREQ message.

In some examples of the present disclosure, the RREQ message may contain an ID, a source IP address of a source node, and a destination IP address of a destination node.

In some examples of the present disclosure, the node may receive several types of messages from a designated interface, such as eth0 interface or adhoc0 interface. These messages may be sent to this designated interface by a previous hop node of the node or be generated by the node itself and then sent to this designated interface of the node.

Table 1 below shows different types of messages sent and received by the nodes in the wireless Mesh network. Table 1 also illustrates information included in different types of messages.

TABLE 1

| Message | Information included |
| --- | --- |
| neighbor discovery message | IP address, MAC address and location information of the node |
| Routing request (RREQ) message | Source IP address and Destination IP address |
| Routing response (RREP) message | Source IP address and Destination IP address |
| Data packet | Source IP address, Destination IP address and Data |
| Other messages | Other information |

Therefore, after receiving a message, the node may determine what type of message it is firstly before taking any actions. The steps in block 104 will be executed once the node determines that the message received is a RREQ message.

In block 106, the node determines whether the ID has already existed in a RREQ ID list established in the node.

In block 108, in response to the ID is not in the RREQ ID list, the node may record the source IP address contained in the RREQ message as a destination IP address in a routing table established in the node and record the previous hop node who sent the RREQ message as a next hop node corresponding to the destination IP address in the routing table.

In some examples of the present disclosure, after recording the source IP address contained in the RREQ message as a destination IP address and recording the previous hop node who sent the RREQ message as a next hop node corresponding to the destination IP address in the routing table, when the node receives a data packet whose destination IP address is listed in the routing table, the node may look up for the destination IP address of the data packet in the routing table, and get to know the next hop node corresponding to the destination IP address. In this case, the node could then forward the data packet to the next hop node.

In some examples of the present disclosure, the routing table may take a key-value dictionary structure. Specifically, in this case, the destination IP address would be taken as a key, and the MAC address of the next hop node corresponding to the destination IP address would be taken as a value corresponding to the key. Therefore, if the node knows the key (the destination IP address), it can search the routing table for the key (the destination IP address) and then obtain the value (the MAC address of the next hop node corresponding to the destination IP address) corresponding to the key. Moreover, the MAC address of the next hop node corresponding to the destination IP address may be further taken as a sub-key, and other auxiliary information of the next hop node would be taken as a sub-value corresponding to the sub-key. Therefore, if the node knows the sub-key (the MAC address), it can search the routing table for the sub-key (the MAC address) and then obtain the sub-value (auxiliary information of the next hop node) corresponding to the sub-key.

In some examples of the present disclosure, the routing table of a node may be established firstly based on the neighbor list of the node. That is, the IP addresses of a neighbor node of the node would be added as a destination node in the routing table, and the MAC address of the neighbor node would be added as a next hop node corresponding to the destination node in the routing table.

In some examples of the present disclosure, in response to determining the ID is already in the RREQ ID list, the node would ignore the RREQ message and take no further actions.

In block 110, the node determines whether the destination IP address contained in the RREQ message is the IP address of the node itself.

In this block, the node would determine whether itself is the destination node of the RREQ message or not.

In block 112, in response to determining that the destination IP address is not the IP address of the node, the node may select a pre-determined number of nodes from the neighbor list as next hop nodes of the RREQ message according to the position information of every neighbor node.

In some examples of the present disclosure, the node may calculate a Euclidean distance between each neighbor node and the destination node of the RREQ message according to the position information of every neighbor node and the position information of the destination node of the RREQ message. Then, the node would select the pre-determined number of neighbor nodes with the shortest Euclidean distances from the neighbor list as the next hop nodes.

For example, assuming that the pre-determined number is k, after determining the Euclidean distance between each neighbor node and the destination node of the RREQ message, the node would select k neighbor node with first k shortest Euclidean distance as the next hop nodes of the RREQ message.

Specifically, in some examples of the present disclosure, the position information may be presented in form of two or more hexadecimal numbers which is pre-configured to each node of the wireless Mesh network. In this case, before calculating the Euclidean distance, the node would first transfer the position information of each neighbor node into coordinates of each neighbor node. The node would also transfer the position information of the destination node of the RREQ message into coordinates of the destination node of the RREQ message.

To be noted, after the configuration of the wireless Mesh network, the position information, the IP address, and the MAC address of each node may be uploaded to a server of the wireless Mesh network, therefore, the node can obtain the position information of the destination node of the RREQ message from the server according to the destination IP address of the RREQ message.

Here, the above transfer process may refer to transferring the two or more hexadecimal numbers into two or more decimal numbers. Then the two or more decimal numbers would be taken as coordinates of the node. For example, if the position information of a node contains two numbers, the coordinates of the node would be represented as (x, y). If the position information of a node contains three numbers, the coordinates of the node would be represented as (x, y, z).

After determining the coordinates of each neighbor node and the destination node of the RREQ message, the node would then calculate the Euclidean distance between each neighbor node and the destination node of the RREQ message. To be noted, the calculation would refer to the following equation (1) or (2).

$$d=\sqrt{(X-x)^2+(Y-y)^2} \qquad (1)$$

$$d=\sqrt{(X-x)^2+(Y-y)^2+(Z-z)^2} \qquad (2)$$

Wherein, (X, Y) or (X, Y, Z) represent coordinates of the destination node of the RREQ message; (x, y) or (x, y, z) represent coordinates of a neighbor node; and d represents the Euclidean distance between these two nodes.

In the above block, while selecting k neighbor nodes with first k shortest Euclidean distance as the next hop nodes of the RREQ message, if two or more neighbor nodes have the same Euclidean distance, the node may select the neighbor node with the minimum transmission delay according to its neighbor list. Further, if two or more neighbor nodes have the same transmission delay, the node may select the neighbor nodes randomly.

In block 114, the node may send the RREQ message to the next hop nodes.

In block 116, in response to determining that the destination IP address is the IP address of the node, the node may generate a RREP message according to the RREQ message and send the RREP message back to the source node of the RREQ message.

With the transmission of the RREQ message through the nodes, a route path from the source node to the destination node of the RREQ message can be discovered, and at the same time, a rout path from the destination node to the source node of the RREQ message can be recorded in routing tables of the nodes along the route path. The above process would be called as a first part of a route discovery process for short hereinafter.

Moreover, according to the above process, since the RREQ message is sent to only a pre-determined number of next hop nodes rather than being broadcast to all its neighbors, a broadcast storm could be well avoided. Moreover, since the next hop nodes of the RREQ message are determined based on the position information of its neighbor nodes, or specifically based on the Euclidean distances between the destination node of the RREQ message and the neighbor nodes, the route path set up would be a path with a shortest transmission delay from the destination node of the RREQ message to the source node of the RREQ message, therefore, the transmission delay of a data packet would be minimized.

Figure 2:
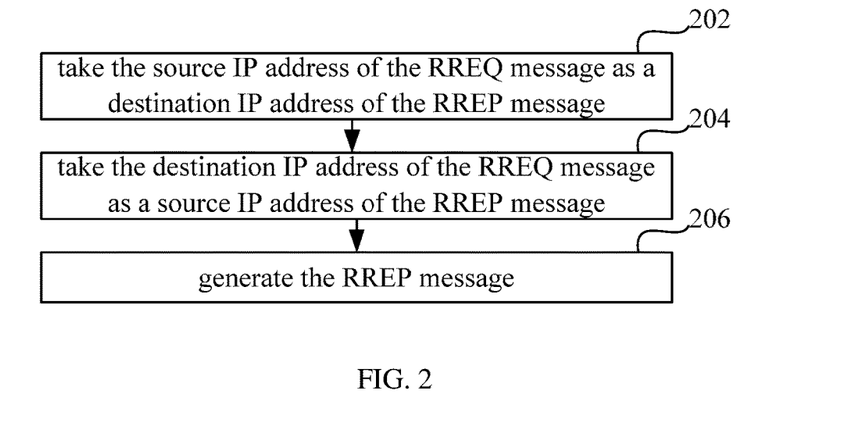
FIG. 2 is flow chart illustrating the method of generating the RREP message by a node of the wireless Mesh network according to one or more examples of the present disclosure.

In some examples of the present disclosure, FIG. 2 is flow chart illustrating the method of generating the RREP message by a node of the wireless Mesh network according to one or more examples of the present disclosure. According to FIG. 2 the method may include the following steps.

In block 202, the node takes the source IP address of the RREQ message as a destination IP address of the RREP message.

In block 204, the node takes the destination IP address of the RREQ message as a source IP address of the RREP message.

In block 206, the node then generates the RREP message, in which the source IP address of the RREP message and the destination IP address of the RREP message are included.

Furthermore, in some examples of the present disclosure, the RREP message may be sent back to the source node of the RREQ message in a unicast way.

That is, the node would send the RREP message according to its routing table. For the routing table records a plurality destination IP addresses and a next hop node corresponding to each destination IP address, the node would look up the routing table for the destination IP address of the RREP message (which is also the source IP address of the RREQ message) and find out the next hop node corresponding to the destination IP address. Then the node may send the RREP message to the next hop node corresponding to the destination IP address of the RREP message. Further, the node would also record the source IP address contained in the RREP message as a destination IP address in the routing table and record the previous hop node who sent the RREP message as a next hop node corresponding to the destination IP address in the routing table.

One would understand that since in the above block 108, the source IP address of the RREQ message would be recorded as a destination IP address in the routing table, in this block, the node could surely find the destination IP address of the RREP message in the routing table.

With the transmission of the RREP message through the nodes, a route path from the destination node of the RREP message (the source node of the RREQ message) to the source node of the RREP message (the destination node of the RREQ message) can be established.

In some other examples of the present disclosure, the RREP message may be sent back to the source node of the RREQ message in a way like multicast.

Figure 3:
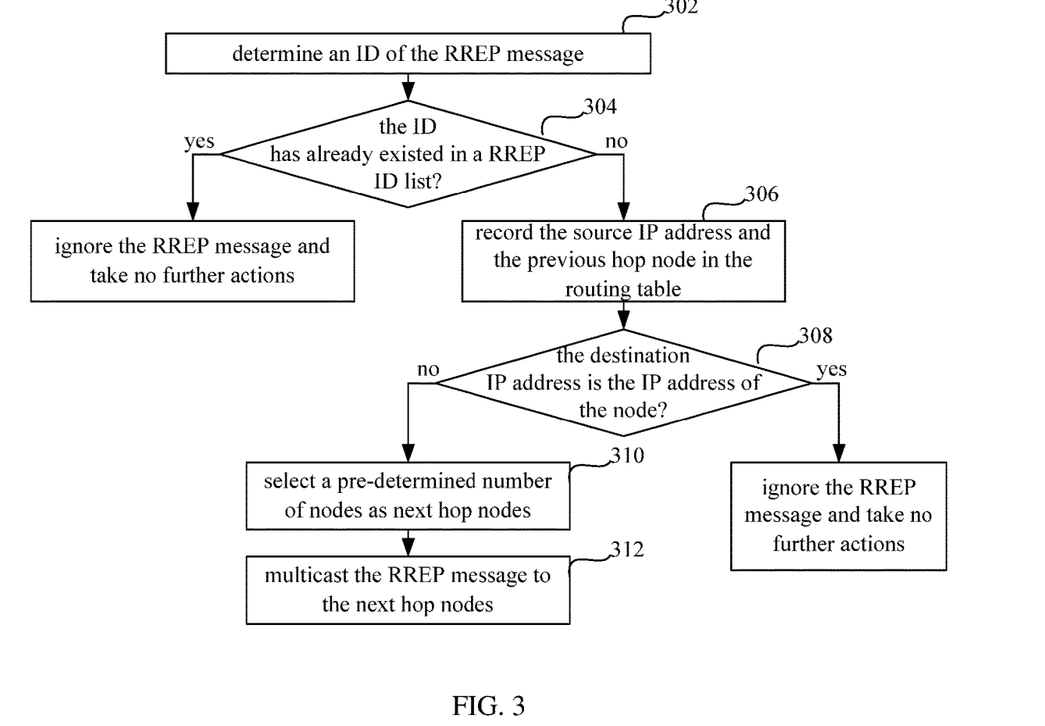
FIG. 3 is a flow chart illustrating the method for dealing with a RREP message received by a node in the wireless Mesh network.

FIG. 3 is a flow chart illustrating the method for dealing with a RREP message received by a node in the wireless Mesh network. As shown in FIG. 3, the method may include the following steps.

In block 302, in response to receiving a RREP message from a previous hop node, the node may determine an ID of the RREP message.

Since the node may receive several types of messages from a pre-defined interface, such as eth0 interface or adhoc0 interface, after receiving a message, the node would determine what type of message it is before taking any actions. The steps in block 302 would be executed after the node determines that the message received is a RREP message.

In block 304, the node determines whether the ID has already existed in a RREP ID list established by the node.

In block 306, in response to the ID is not in the RREP ID list, the node may record the source IP address contained in the RREP message as a destination IP address in the routing table and record the previous hop node who sent the RREP message as a next hop node corresponding to the destination IP address in the routing table.

In some examples of the present disclosure, after recording the source IP address contained in the RREP message as a destination IP address and recording the previous hop node who sent the RREP message as a next hop node in the routing table, when the node receives a data packet whose destination IP address is listed in the routing table, the node may look up for the destination IP address in the routing table, and get to know the next hop node corresponding to the destination IP address. In this case, the node could then forward the data packet to the next hop node.

In some examples of the present disclosure, in response to determining the ID is already in the RREP ID list, the node would ignore the RREP message and take no further actions.

In block 308, the node may determine whether the destination IP address contained in the RREP message is the IP address of the node.

In this block, the node would determine whether it is the destination node of the RREP message or not.

In block 310, in response to determining that the destination IP address is not the IP address of the node, the node may select a pre-determined number of nodes from the neighbor list as next hop nodes of the RREP message according to the position information of every neighbor node.

In some examples of the present disclosure, the node would calculate a Euclidean distance between each neighbor node and the destination node of the RREP message according to the position information of every neighbor node and the position information of the destination node of the RREP message. And then, the node would select the pre-determined number of neighbor nodes with the shortest Euclidean distance from the neighbor list as the next hop nodes. For example, assuming that the pre-determined number is k, after determining the Euclidean distance between each neighbor node and the destination node of the RREP message, the node would select k neighbor node with first k shortest Euclidean distance as the next hop nodes of the RREP message.

As stated above, before calculating the Euclidean distance, the node would first transfer the position information of each neighbor node into coordinates of each neighbor node respectively. The node would also transfer the position information of the destination node of the RREP message into coordinates of the destination node of the RREP message. Here, the transfer process may refer to transferring the two or more hexadecimal numbers into two or more decimal numbers. Then the two or more decimal numbers would be taken as coordinates of the node. After determining the coordinates of each neighbor node and the destination node of the RREP message, the node would then calculate the Euclidean distance between each neighbor node and the destination node of the RREQ message. To be noted, the calculation would refer to the above equation (1) or (2).

In this example, (X, Y) in equation (1) or (X, Y, Z) in equation (2) represent coordinates of the destination node of the RREP message; (x, y) in equation (1) or (x, y, z) in equation (2) represent coordinates of a neighbor node; and d in equation (1) or (2) represents the Euclidean distance between these two nodes.

While selecting k neighbor nodes with first k shortest Euclidean distance as the next hop nodes of the RREP message, if two or more neighbor nodes have the same Euclidean distance, the node may select the neighbor node with the minimum transmission delay according to its neighbor list. Further, if two or more neighbor nodes have the same transmission delay, the node may select the neighbor nodes randomly.

In block 312, the node may send the RREP message to the next hop nodes.

Moreover, in response to determining that the destination IP address is the IP address of the node, the node would then ignore the RREP message and take no further actions.

Through the transmission of the RREP message, a route path from the source node to the destination node of the RREP message (the destination node to the source node of the RREQ message) can be discovered, and at the same time, a rout path from the destination node to the source node of the RREP (the source node to the destination node of the RREQ message) message can be recorded in routing tables of the nodes along the route path.

According to the above method, since the RREP message is sent to only a pre-determined number of next hop nodes rather than being broadcast to all its neighbors, any broadcast storm would be avoided. Moreover, since the next hop nodes of the RREP message are determined based on the position information of its neighbor nodes, or specifically based on the Euclidean distances between the destination node of the RREP message and the neighbor nodes, the route path set up would be a path with a shortest transmission delay from the destination node of the RREP message to the source node of the RREP message, therefore, the transmission delay of a data packet would be minimized. Moreover, in this way, the route path set up may go through different nodes with the route path set in in the process of block 102 to block 116.

The above process would be called as a second part of a route discovery process for short hereinafter. The above processes of transmissions of the RREQ message and the above processes of transmissions of the RREP message may be called as a route discovery process.

Figure 4:
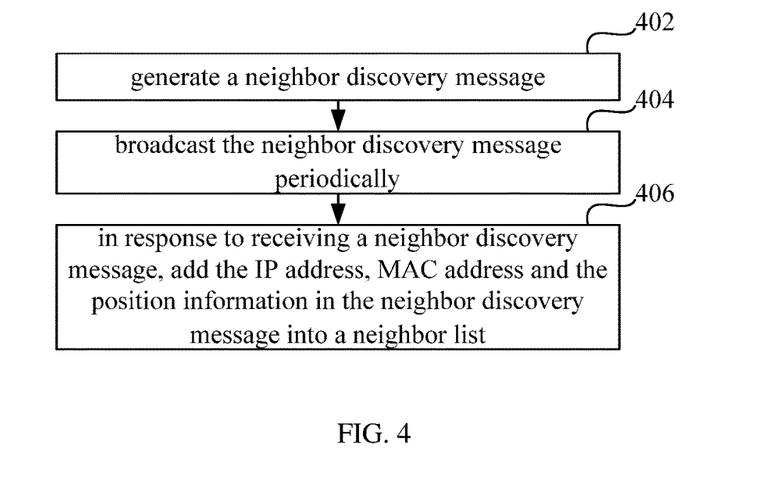
FIG. 4 is a flow chart illustrating the neighbor discovery process performed by a node of the wireless Mesh network according to one or more examples of the present disclosure.

FIG. 4 is a flow chart illustrating the neighbor discovery process performed by a node of the wireless Mesh network according to one or more examples of the present disclosure. According to FIG. 4, the neighbor discovery process may include the following steps to establish a neighbor list.

In block 402, the node generates a neighbor discovery message, in which the IP address of the node, the MAC address of the node and the position information of the node are included.

In some examples of the present disclosure, the neighbor discovery message may be a HELLO message, and the IP address of the node, the MAC address of the node and the position information of the node may be attached into the data part of the HELLO message.

In some examples of the present disclosure, the neighbor discovery message may also include a time stamp which shows a sending time of the neighbor discovery message.

In block 404, the node broadcasts the neighbor discovery message periodically.

In some examples of the present disclosure, the node may broadcast the neighbor discovery message at an interval of $T_{broadcast\_interval}$.

In block 406, in response to receiving a neighbor discovery message from a neighbor node, the node may add the IP address, MAC address and the position information contained in the neighbor discovery message into a neighbor list.

In some examples of the present disclosure, the node may respond an acknowledgement (ACK) message to the neighbor node.

In some examples of the present disclosure, the node may further calculate a transmission delay of the neighbor node according to the time stamp contained in the neighbor discovery message and a receiving time of the neighbor discovery message and add the transmission delay of the neighbor node into the neighbor list.

Further, the node may also add the receiving time of the neighbor discovery message into the neighbor list as a latest active time of the neighbor node.

Figure 5:
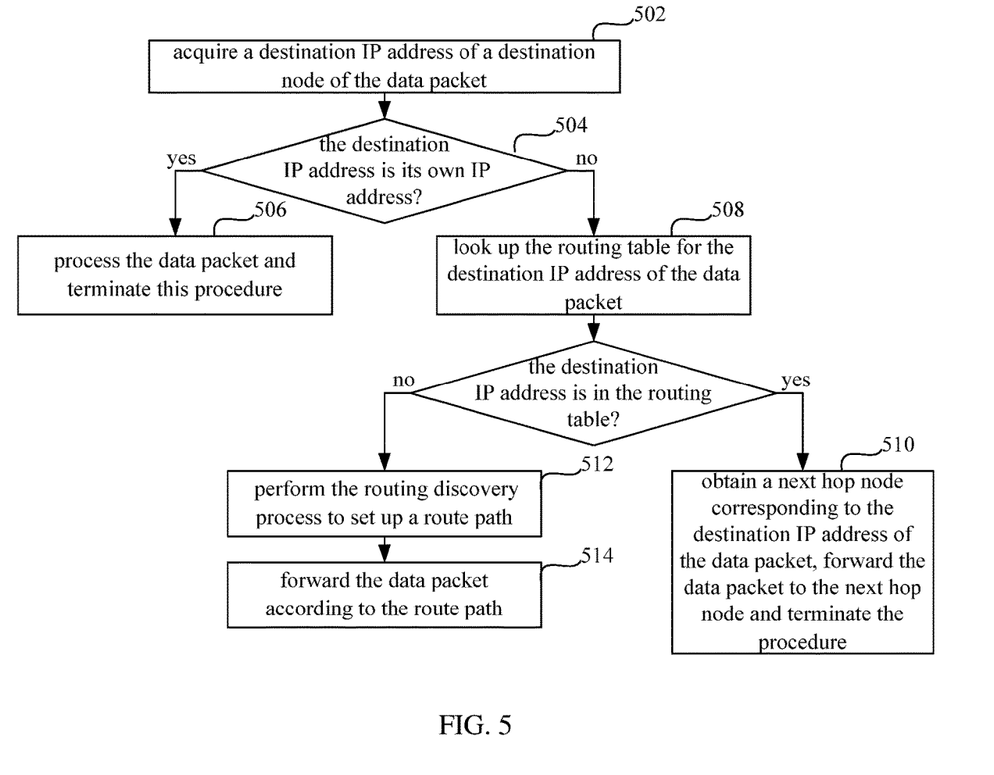
FIG. 5 is a flow chart illustrating the data transmission process performed by a node of the wireless Mesh network according to one or more examples of the present disclosure.

Based on the above method for setting up route path, a data packet transmission process can be then conducted. FIG. 5 is a flow chart illustrating the data transmission process performed by a node of the wireless Mesh network according to one or more examples of the present disclosure. According to FIG. 5, the data transmission process may include the following steps.

In block 502, in response to receiving a data packet, the node may acquire a destination IP address of a destination node of the data packet.

In some examples of the present disclosure, after receiving a data packet, the node may further send an ACK message to its previous hop node.

In block 504, the node may check whether the destination IP address of the data packet is its own IP address.

In block 506, in response to determining that the destination IP address of the data packet is its own IP address, the node may process the data packet and terminate this procedure.

In some examples of the present disclosure, the node may obtain information within the data packet.

In block 508, in response to determining that the destination IP address of the data packet is not its own IP address, the node may look up the routing table for the destination IP address of the data packet.

In block 510, in response to finding the destination IP address of the data packet is in the routing table, the node may obtain a next hop node corresponding to the destination IP address of the data packet, forward the data packet to the next hop node and then terminate the procedure.

In block 512, in response to finding that the destination IP address of the data packet is not in the routing table, the node may perform the routing discovery process to set up a route path from the node to the destination node of the data packet.

In block 514, after the route path from the node to the destination node of the data packet is established, the node may forward the data packet according to the route path.

That is, the node may forward the data packet to a next hop node according to the routing table established.

Through the above process, a node in the wireless Mesh network could handle a data packet received. That is, if there is already a route path to the destination node, the node would forward the data packet through the route path. Otherwise, the node would conduct a route discovery process to set up a route path to the destination node and then forward the data packet through the route path. And through the cooperation of nodes in the wireless Mesh network, a data packet can be transmitted from the source node to the destination node according to a route path established. Since the route path is established based on the location of each node, the route path established may have a relative shorter distance. Therefore, the transmission delay of the data packet would be minimized.

It can be seen from the above processes, each node in the wireless Mesh network designates an interface, such as eth0 interface or adhoc0 interface, to receive messages. After receiving a message, each node would determine the type of the message first. If the message is a neighbor discovery message, such as a HELLO message, the neighbor discovery process would be executed to establish a neighbor list. If the message is a RREQ message, a first part of a route discovery process would be executed to establish a route path from the destination node of the RREQ message to the source node of the RREQ message. If the message is a RREP message, a second part of a route discovery process would be executed to establish a route path from the source node of the RREQ message to the destination node of the RREQ message. Moreover, if the message is a data packet, a data transmission process would be executed to transmit the data packet to the destination node of the data packet. In addition, if the message is any other type of message defined, a processing policy corresponding to the message would be invoked.

Figure 6:
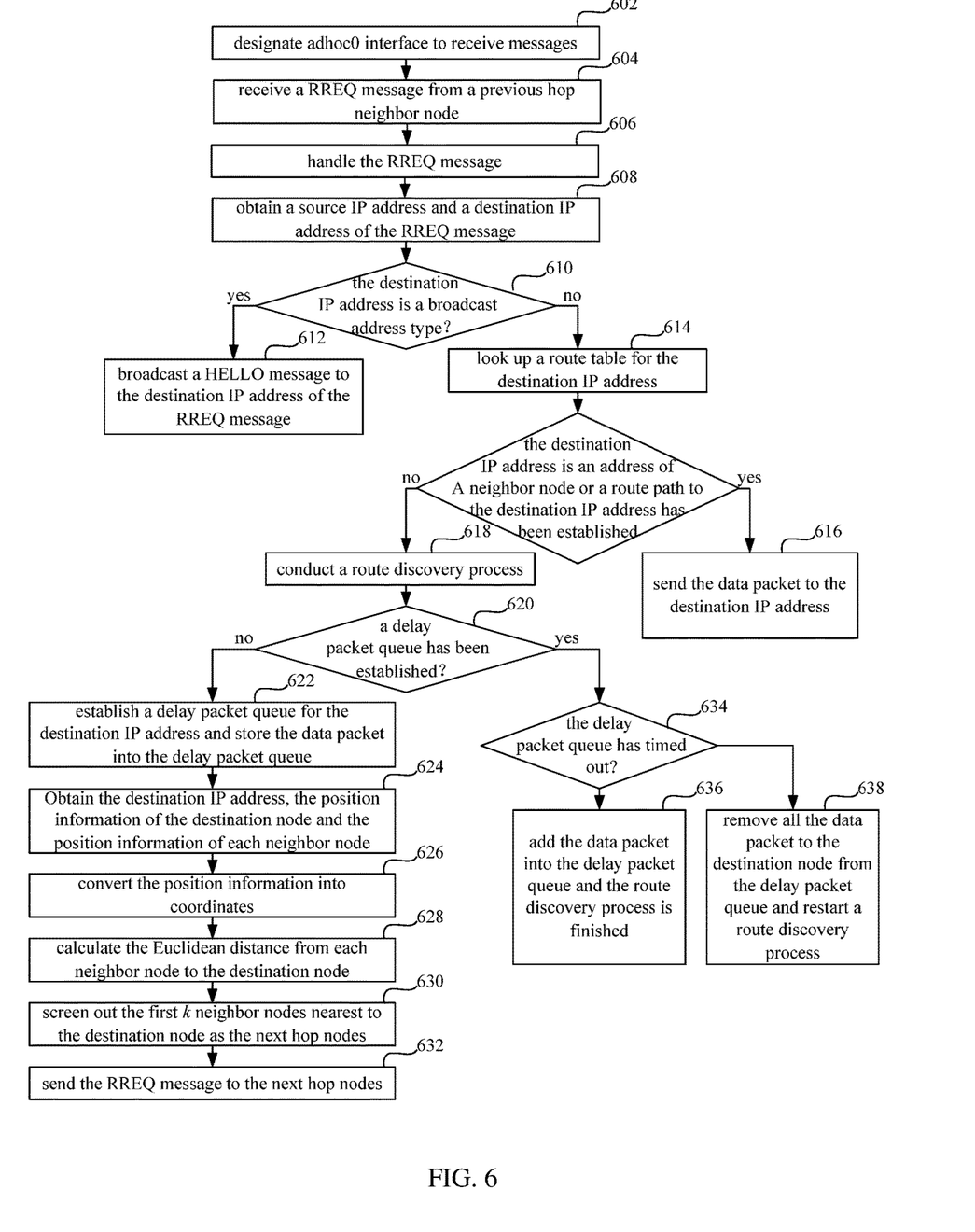
FIG. 6 is a flow chart illustrating the first part route discovery process performed by each node in the wireless Mesh network according to one or more examples of the present disclosure.

FIG. 6 is a flow chart illustrating the first part route discovery process performed by each node in the wireless Mesh network in a more specific way according to one or more examples of the present disclosure. According to FIG. 6, the route discovery process would include the following steps.

In block 602, the node designates adhoc0 interface to receive messages.

In block 604, the node receives a RREQ message sent by a previous hop neighbor node from the adhoc0 interface.

In block 606, the node handles the RREQ message. Specifically, the node may send an ACK message to the previous hop neighbor node; add the ID of the RREQ message into an ID list $L_{rreq\_ids}$; and if the ID already exists in the ID list, ignore the RREQ message and do not take any further actions.

In block 608, the node obtains a source IP address and a destination IP address of the RREQ message.

In block 610, the node determines whether the type of the destination IP address is a broadcast address type.

In block 612, in response to determining the type of the destination IP address is a broadcast address type, the node would broadcast a HELLO message to the destination IP address of the RREQ message.

In block 614, in response to determining the type of the destination IP address is not a broadcast address type, the node would look up a route table $L_{entries\_list}$ for the destination IP address, and determine whether the destination IP address is an address of a neighbor node or a route path to the destination IP address has already been established.

In block 616, in response to determining the destination IP address is an address of a neighbor node or a route path to the destination IP address has already been established, the node would send the data packet to the destination IP address without conducting any route discovery process.

In block 618, in response to determining the destination IP address is not an address of a neighbor node and a route path to the destination IP address has not been established, the node would conduct a route discovery process.

In block 620, the node checks whether a delay packet queue $L_{delayed\_packets\_list}$ has been established for the destination IP address.

In block 622, in response to determining the delay packet queue $L_{delayed\_packets\_list}$ has not been established for the destination IP address, the node would establish a delay packet queue $L_{delayed\_packets\_list}$ for the destination IP address and store the data packet into the delay packet queue $L_{delayed\_packets\_list}$.

In block 624, the node obtains the destination IP address of the RREQ message, obtains the position information of the destination node from the server, and obtains the position information of each neighbor node from the neighbor list.

In block 626, the node converts the position information into coordinates. Wherein, $(x_1, y_1)$ represent the coordinates of the destination node; $(x_2, y_2)$ represent the coordinates of a neighbor node.

In block 628, the node calculates the Euclidean distance from each neighbor node to the destination node ($\rho = \sqrt{(x_2-x_1)^2+(y_2-y_1)^2}$, wherein, $\rho$ represents the Euclidean distance from point $(x_2, y_2)$ to point $(x_1, y_1)$).

In block 630, the node screens out the first k neighbor nodes {N1, N2, . . . , Nc} nearest to the destination node as the next hop nodes.

In block 632, the node sends the RREQ message to the next hop nodes through the designated eth0 interface periodically. Wherein, the RREQ message may be sent at an interval time T, and the upper limit of the sending times may be set as N.

In block 634, in response to determining the delay packet queue $L_{delayed\_packets\_list}$ for the destination IP address has been established, the node would check whether the delay packet queue $L_{delayed\_packets\_list}$ has timed out.

In block 636, in response to determining the delay packet queue $L_{delayed\_packets\_list}$ has not timed out (within the time scope of $T_{entry\_deletion\_timeout}$), the node would add the data packet into the delay packet queue $L_{delayed\_packets\_list}$ and the route discovery process is finished.

In block 638, in response to determining the delay packet queue $L_{delayed\_packets\_list}$ has timed out (beyond the time scope of $T_{entry\_deletion\_timeout}$), the node would remove all the data packet to the destination node from the delay packet queue $L_{delayed\_packets\_list}$ and restart a route discovery process.

Each node in the wireless Mesh network would repeat the above process, until the destination node receives the RREQ message. In this way, the route path from the destination node to the source node would be established.

Figure 7:
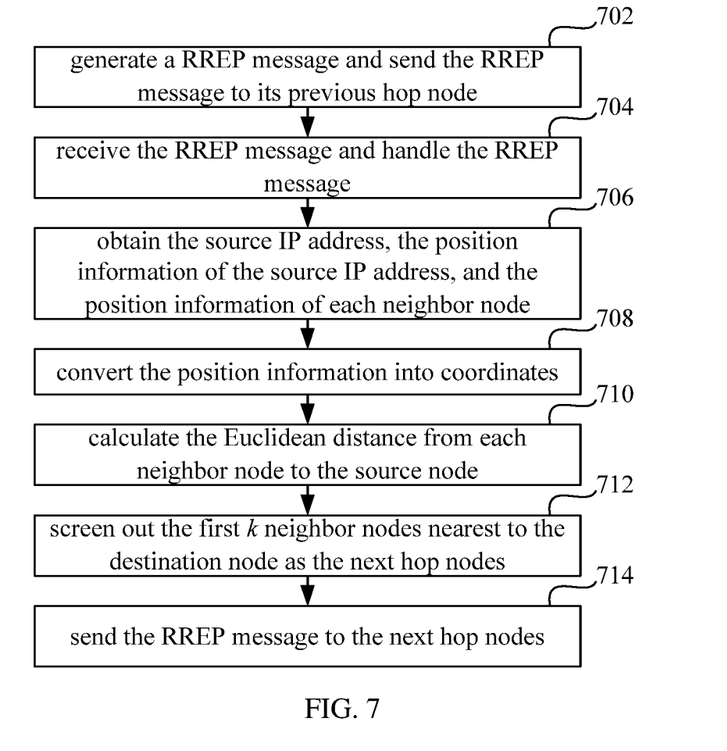
FIG. 7 is a flow chart illustrating the second part route discovery process performed by each node in the wireless Mesh network according to one or more examples of the present disclosure.

FIG. 7 is a flow chart illustrating the second part route discovery process performed by each node in the wireless Mesh network in a more specific way according to one or more examples of the present disclosure. According to FIG. 7, the second part of the route discovery process would include the following steps.

In block 702, after receiving the RREQ message, the destination node would generate a RREP message and send the RREP message to its previous hop node.

In block 704, a node receives the RREP message through a designated interface, and handles the RREP message. Specifically, the node may send an ACK message back, add the ID of the RREP message into an ID list $L_{rreq\_ids}$. If the ID already exists in the ID list, ignore the RREP message and take no further actions.

In block 706, the node obtains the source IP address from the RREP message, obtains the position information of the source IP address from the server, and obtains the position information of each neighbor node from the neighbor list.

In this example, the source IP address mentioned refers to the source IP address of the RREQ message, and it is the destination IP address of the RREP message.

In block 708, the node converts the position information into coordinates. Wherein, $(x_1, y_1)$ represent the coordinates of the source node; $(x_2, y_2)$ represent the coordinates of a neighbor node.

In Block 710, the node calculates the Euclidean distance from each neighbor node to the source node ($\rho = \sqrt{(x_2-x_1)^2+(y_2-y_1)^2}$, wherein, $\rho$ represents the Euclidean distance from point $(x_2, y_2)$ to point $(x_1, y_1)$).

In Block 712, the node screens out the first k neighbor nodes {N1, N2, . . . , Nk} nearest to the destination node as the next hop nodes.

In Block 714, the node sends the RREP message to the next hop nodes.

Each node in the wireless Mesh network would repeat the above process, until the source node receives the RREP message. In this way, the route path from the source node to the destination node would be established.

Figure 8:
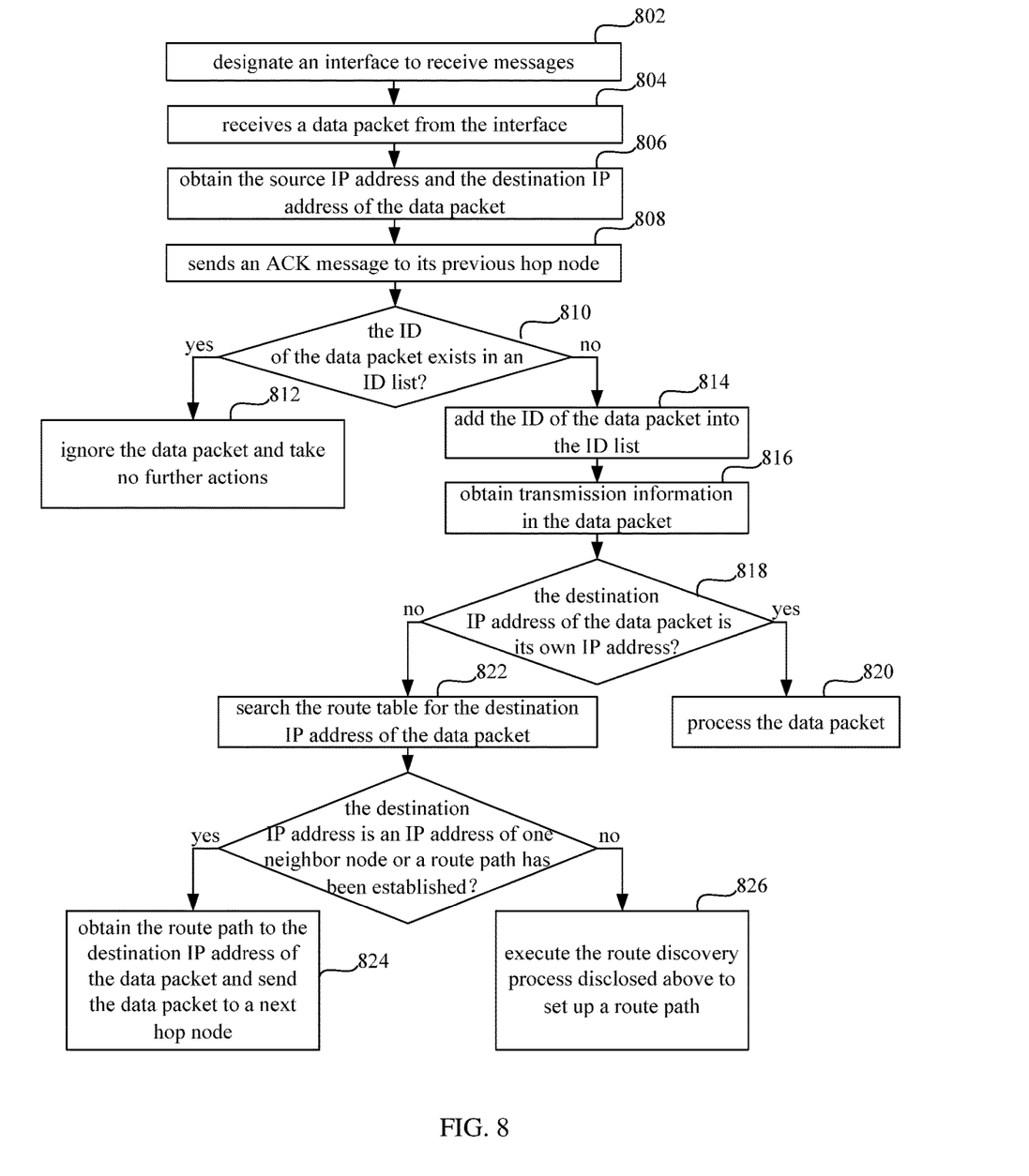
FIG. 8 is a flow chart illustrating the data transmission process performed by each node in the wireless Mesh network according to one or more examples of the present disclosure.

FIG. 8 is a flow chart illustrating the data transmission process performed by each node in the wireless Mesh network in a more specific way according to one or more examples of the present disclosure. According to FIG. 8, the data transmission process would include the following steps.

In block 802, the node designates an interface to receive messages.

In block 804, the node receives a data packet from the interface.

In block 806, the node obtains the source IP address and the destination IP address of the data packet.

In block 808, the node sends an ACK message to its previous hop node.

In block 810, the node determines whether the ID of the data packet exists in an ID list $L_{reliable\_packet\_ids}$.

In block 812, in response to determining the ID of the data packet exists in the ID list $L_{reliable\_packet\_ids}$, the node would ignore the data packet and take no further actions.

In block 814, in response to determining the ID of the data packet does not exist in the ID list $L_{reliable\_packet\_ids}$, the node would add the ID of the data packet into the ID list $L_{reliable\_packet\_ids}$.

In block 816, the node may obtain transmission information in the data packet.

In block 818, the node may check whether the destination IP address of the data packet is its own IP address.

In block 820, in response to determining the destination IP address of the data packet is its own IP address, the node may process the data packet.

In block 822, in response to determining the destination IP address of the data packet is not its own IP address, the node may search the route table for the destination IP address of the data packet to determine whether the destination IP address of the data packet is an IP address of one neighbor node or a route path to the destination IP address of the data packet has been established.

In block 824, in response to determining the destination IP address of the data packet is an IP address of one neighbor node or a route path to the destination IP address of the data packet has been established, the node would obtain the route path to the destination IP address of the data packet and send the data packet to a next hop node according to the route path.

In block 826, in response to determining the destination IP address of the data packet is not an IP address of one neighbor node and a route path to the destination IP address of the data packet has not been established, the node would execute the route discovery process disclosed above to set up a route path to the destination IP address of the data packet.

The above process would be repeated, until all data packets received have been handled or transmitted to its next hop node.

The methods disclosed by the examples of the present description are location-based wireless Mesh network routing methods. Based on the position information of the neighbor nodes and the destination nodes, several neighbor nodes closest to the destination node would be selected in the route discovery process. This route discovery process adopts a greedy forwarding strategy which takes the position information as a main factor for routing. Therefore, the transmission delay of a data packet can be reduced and the number of hops between the nodes can also be minimized.

Compared with the table-driven routing protocol, in the method disclosed, there is no need for a node in the wireless Mesh network to maintain information of all the other nodes. The truth is a node only needs to maintain information of its neighbor nodes. Therefore, the utilization rate of a CPU of a node can be improved, the hardware heat loss of routers can be reduced, and the utilization rate of data transmission can be improved.

In addition, compared with an on-demand routing protocol, in the method disclosed, there is no need to broadcast any routing request message. A node only needs to send a routing request message to several neighbor nodes selected. Therefore, the occupation of bandwidth can be reduced. Moreover, a node would select several neighbor nodes to send the routing request message and the routing response message rather than a single intermediate node, therefore, the situation that the intermediate node is blocked can be avoided. Therefore, not only the risk contingency of unicast forwarding can be avoided, but also the bandwidth occupation can be reduced. By adopting the method disclosed, the throughput can be improved, the transmission delay can be reduced, the routing overhead can be reduced, and the reachability of a network can be ensured.

It should be noted that the method of one or more examples of the present disclosure may be performed by means of a single device, e.g., a computer or a server. The method of the example is also capable of being used in distributed scenarios and completed by cooperation of a plurality of devices. In these distributed scenarios, one of a plurality of devices may only perform one or more steps of the method according to one or more examples of the present disclosure, and a plurality of devices will complete the method by interacting with each other.

Examples of the present disclosure are described. The other examples are within the scope of the present claims. In some cases, the actions or steps recited in the claims may be performed in a different order than that in the examples and still achieve the desired results. In addition, the processes depicted in the accompanying figures do not necessarily require the order shown, or sequential order, to achieve desirable results. In some examples, multitasking and parallel processing are permissible or may be beneficial.

Figure 9:
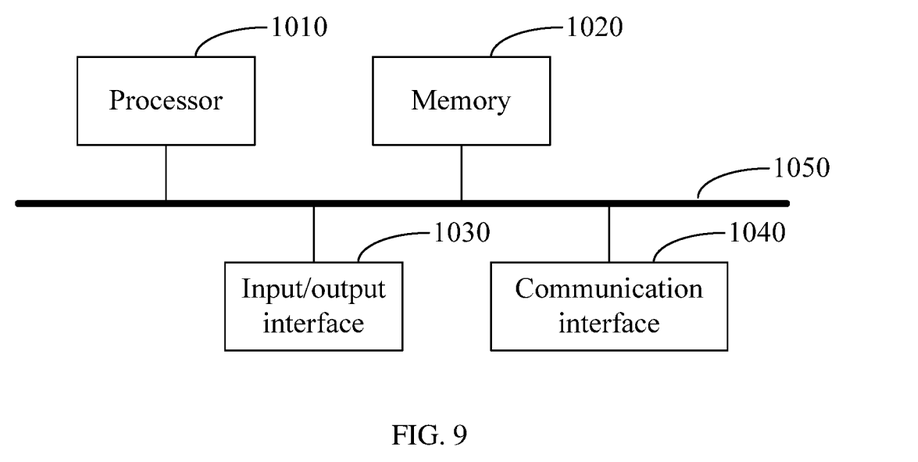
FIG. 9 is a schematic diagram illustrating the structure of the device according to one or more examples of the present disclosure.

Based on the same concept, one or more examples of the present disclosure also provide a device for setting up a route path in a wireless Mesh network. FIG. 9 is a schematic diagram illustrating the structure of the device to one or more examples of the present disclosure. Referring to FIG. 9, the device may include one or more processors 1010, a one or more memories 1020, an input/output interface 1030, a communication interface 1040 and a bus 1050. The processor 1010, the memory 1020, the input/output interface 1030 and the communication interface 1040 realize the communication connection in the device by means of the bus 1050.

In this device, the one or more memories 1020 store one or more instructions, and when executed by the one or more processors, the instructions cause the one or more processors to execute the above method for setting up a route path in a wireless Mesh network.

The one or more processors 1010 may be realized in the form of a general-purpose Central Processing Unit (CPU), a microprocessor, a Request Specific Integrated Circuit (ASIC), or one or more integrated circuits, etc. to perform relevant programs, thus realizing the technical solutions provided by the examples of the present disclosure.

The one or more memories 1020 may be realized in the form of Read Only Memory (ROM), Random Access Memory (RAM), static storage device, dynamic storage device and the like. The memory 1020 may store an operating system and other application programs. When the technical solutions provided by the examples of the present disclosure is implemented by means of software or firmware, related program codes are stored in the memory 1020 and called and executed by the processor 1010.

The input/output interface 1030 is used to connect to an input/output module to realize information input and output. The input/output module may be arranged as a component in the equipment (not shown), or externally connected to the equipment to provide corresponding functions. The input equipment may comprise a keyboard, a mouse, a touch screen, a microphone and a plurality of sensors, and the output equipment may comprise a display, a speaker, a vibrator, and an indicator light.

The communication interface 1040 is used to connect to a communication module (not shown) to realize a communication interaction between the equipment and other equipment. The communication module may communicate by wired means (e.g., USB and network cable) or wireless means (e.g., mobile network, WIFI and Bluetooth).

The bus 1050 comprises a path transferring information among a plurality of components of the equipment, e.g., the processor 1010, the memory 1020, the input/output interface 1030 and the communication interface 1040.

It should be noted that although the equipment only shows the processor 1010, the memory 1020, the input/output interface 1030, the communication interface 1040 and the bus 1050, the equipment may further comprise other components necessary for normal operation in the specific implementation process. In addition, it should be understood by those of ordinary skill in the art that the equipment may only comprise components necessary for realizing the solution of the examples of the present disclosure, but not necessarily comprise all the components shown in the figures.

The computer readable medium of the examples includes volatile, non-volatile, movable, and non-movable media, which may realize information storage by means of any method or technology. The information may be computer readable instruction, data structure, program module or other data. The example of computer storage medium includes but not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read only memory (CD-ROM), digital versatile disc (DVD) or other optical memories, cassette magnetic tape, tape, magnetic disk storage or other magnetic memory devices or any other non-transmission media, which can store information accessible by the computing device.

Those of ordinary skill in the art should understand that: any of the examples in discussion is exemplary only and not implicitly intended to limit the scope of the present disclosure (including the claims); based on the concept of the present disclosure, the technical features of the example or different examples can also be combined, the steps can be performed in any order, and there are many other changes in different aspects of one or more examples of the present disclosure, which are not provided in detail for brevity.

In addition, to simplify the description and discussion and avoid obscuring a clear understanding of one or more examples of the present disclosure, well-known power/ground connection with integrated circuit (IC) chips and other components may or may not be shown in the figures. In addition, the devices can be shown in the form of block diagrams to avoid obscuring a clear understanding of one or more examples of the present disclosure, and it also considers the fact that the details about the implementation of these devices in block diagrams are highly dependent on the platform whereon one or more examples of the present disclosure will be implemented (i.e., these details should within the understanding of those of ordinary skill in the art). While specific details (e.g., circuits) have been elaborated to describe the exemplary example of the present disclosure, it is apparent to those of ordinary skill in the art that one or more examples of the present disclosure can be implemented without these details or with changes therein. Therefore, the description should be considered illustrative instead of limitation thereto.

Although the present disclosure has been described in combination with specific examples thereof, many replacements, modifications and alterations of the examples will be apparent to those of ordinary skill in the art according to the preceding part of the text. For example, other memory architectures (e.g., dynamic RAM (DRAM)) may employs the example in discussion.

One or more examples of the present disclosure are intended to cover all such replacements, modifications and alterations that fall into the broad protection scope as defined in the claims. All omissions, alterations, equivalent replacements, and improvements, without departing from the spirit and principle of the present disclosure, should fall within the protection scope of the present disclosure.

What is claimed is:

1. A method for setting up a route path executed by a node in a wireless Mesh network, comprising:

establishing a neighbor list; wherein, the neighbor list comprises neighbor nodes of the node and position information of the neighbor nodes;

in response to receiving a routing request (RREQ) message from a previous hop node, recording a source Internet Protocol (IP) address of a source node contained in the RREQ message as a destination IP address in a routing table established in the node;

recording the previous hop node as a next hop node corresponding to the destination IP address in the routing table;

selecting a pre-determined number of nodes from the neighbor list as next hop nodes of the RREQ message according to the position information of the neighbor nodes; and sending the RREQ message to the next hop nodes.

2. The method according to claim 1, wherein, establishing a neighbor list comprises:

generating a first neighbor discovery message, wherein, the neighbor discovery message comprises an IP address of the node, a Media Access Control (MAC) address of the node and position information of the node;

broadcasting the first neighbor discovery message periodically; and in response to receiving a second neighbor discovery message from a neighbor node, the node may add an IP address, an MAC address and position information contained in the second neighbor discovery message into the neighbor list.

3. The method according to claim 1, wherein, the neighbor discovery message further comprises a time stamp recording a sending time of the neighbor discovery message; the method further comprises:

calculating a transmission delay of the neighbor node according to the time stamp contained in the neighbor discovery message and a receiving time of the neighbor discovery message; and adding the transmission delay of the neighbor node into the neighbor list.

4. The method according to claim 1, wherein, selecting a pre-determined number of nodes from the neighbor list as next hop nodes of the RREQ message comprises:

calculating a Euclidean distance between each neighbor node and a destination node of the RREQ message according to the position information of the neighbor nodes and position information of the destination node of the RREQ message; and select the pre-determined number of neighbor nodes with the shortest Euclidean distances from the neighbor nodes as the next hop nodes.

5. The method according to claim 4, wherein, calculating a Euclidean distance between each neighbor node and the destination node of the RREQ message comprises:

converting the position information of each neighbor node into coordinates of each neighbor node;

obtaining the position information of the destination node of the RREQ message from a server according to the destination IP address of the RREQ message;

converting the position information of the destination node of the RREQ message into coordinates of the destination node of the RREQ message; and calculating the Euclidean distance between each neighbor node and the destination node of the RREQ message according to the coordinates of the neighbor nodes and the destination node of the RREQ message.

6. The method according to claim 5, wherein, the neighbor list further comprises transmission delays of the neighbor nodes;

the method further comprises: in response to determining two or more neighbor nodes have the same Euclidean distance, selecting the neighbor node with a minimum transmission delay according to the neighbor list.

7. The method according to claim 6, further comprising: in response to determining two or more neighbor nodes have the same transmission delay, selecting the neighbor node randomly.

8. The method according to claim 1, further comprising: determining whether an identification (ID) of the RREQ message is in a RREQ ID list established in the node;

in response to determining the ID is not in the RREQ ID list, adding the ID in the RREQ ID list and performing the step of recording a source IP address; and in response to determining the ID is in the RREQ ID list, ignoring the RREQ message and terminating the method.

9. The method according to claim 1, further comprising: determining whether a destination IP address of a destination node contained in the RREQ message is an IP address of the node;

in response to determining that the destination IP address is not the IP address of the node, performing the step of selecting a pre-determined number of nodes; and in response to determining that the destination IP address is the IP address of the node, generating a routing response (RREP) message according to the RREQ message and sending the RREP message back to the source node of the RREQ message.

10. The method according to claim 9, wherein, sending the RREP message back to the source node of the RREQ message comprises: sending the RREP message according to the routing table.

11. The method according to claim 9, wherein, sending the RREP message back to the source node of the RREQ message comprises:

selecting a pre-determined number of nodes from the neighbor list as next hop nodes of the RREP message according to the position information of the neighbor nodes; and sending the RREP message to the next hop nodes.

12. The method according to claim 9, wherein, generating a RREP message comprises:

taking the source IP address of the RREQ message as a destination IP address of the RREP message;

taking the destination IP address of the RREQ message as a source IP address of the RREP message; and generating the RREP message; wherein the RREP message comprises the source IP address of the RREP message and the destination IP address of the RREP message.

13. The method according to claim 1, further comprising: in response to receiving a RREP message from a second previous hop node, recording the source IP address contained in the RREP message as a destination IP address in the routing table;

recording the second previous hop node as a next hop node corresponding to the destination IP address in the routing table;

selecting a second pre-determined number of nodes from the neighbor list as next hop nodes of the RREP message according to the position information of the neighbor nodes; and sending the RREP message to the next hop nodes.

14. The method according to claim 13, wherein, selecting a second pre-determined number of nodes from the neighbor list as next hop nodes of the RREP message comprises:

calculating a Euclidean distance between each neighbor node and a destination node of the RREP message according to the position information of the neighbor nodes and position information of the destination node of the RREP message; and select the pre-determined number of neighbor nodes with the shortest Euclidean distances from the neighbor nodes as the next hop nodes.

15. The method according to claim 14, wherein, calculating a Euclidean distance between each neighbor node and the destination node of the RREP message comprises:

converting the position information of each neighbor node into coordinates of each neighbor node;

obtaining the position information of the destination node of the RREP message from a server according to the destination IP address of the RREP message;

converting the position information of the destination node of the RREP message into coordinates of the destination node of the RREP message; and calculating the Euclidean distance between each neighbor node and the destination node of the RREQ message according to the coordinates of the neighbor nodes and the destination node of the RREQ message.

16. The method according to claim 13, further comprising:

determining whether a destination IP address contained in the RREP message is the IP address of the node;

in response to determining that the destination IP address is not the IP address of the node, performing the step of selecting a second pre-determined number of nodes;

in response to determining that the destination IP address is the IP address of the node, terminating the method.

17. The method according to claim 1, further comprising:

in response to receiving a data packet, acquiring a destination IP address of a destination node of the data packet;

looking up the routing table for the destination IP address of the data packet;

in response to finding the destination IP address of the data packet in the routing table, obtaining a next hop node corresponding to the destination IP address of the data packet, forwarding the data packet to the next hop node; and in response to finding that the destination IP address of the data packet is not in the routing table, setting up a route path from the node to the destination node of the data packet and forwarding the data packet according to the route path.

18. The method according to claim 17, further comprising:

checking whether the destination IP address of the data packet is its own IP address;

in response to determining that the destination IP address of the data packet is its own IP address, processing the data packet; and in response to determining that the destination IP address of the data packet is not its own IP address, performing the step of looking up the routing table for the destination IP address of the data packet.

19. A non-transitory computer-readable storage medium, wherein the non-transitory computer-readable storage medium stores computer instructions, and the computer instructions being used to make a computer execute the method for setting up a route path of claim 1.

20. A device for setting up a route path, comprising:

one or more processors, one or more memories, and a communication bus configured to couple the one or more processors and the one or more memories; wherein the one or more memories store one or more instructions, and when executed by the one or more processors, the instructions cause the one or more processors to:

establish a neighbor list; wherein, the neighbor list comprises neighbor nodes of the node and position information of the neighbor nodes;

in response to receiving a routing request (RREQ) message from a previous hop node, record a source Internet Protocol (IP) address of a source node contained in the RREQ message as a destination IP address in a routing table established in the node;

record the previous hop node as a next hop node corresponding to the destination IP address in the routing table;

select a pre-determined number of nodes from the neighbor list as next hop nodes of the RREQ message according to the position information of the neighbor nodes; and send the RREQ message to the next hop nodes.

* * * * *